Feb. 20, 1934.  A. T. POTTER  1,947,736
FRAME CORNER BEAD
Filed March 6, 1933
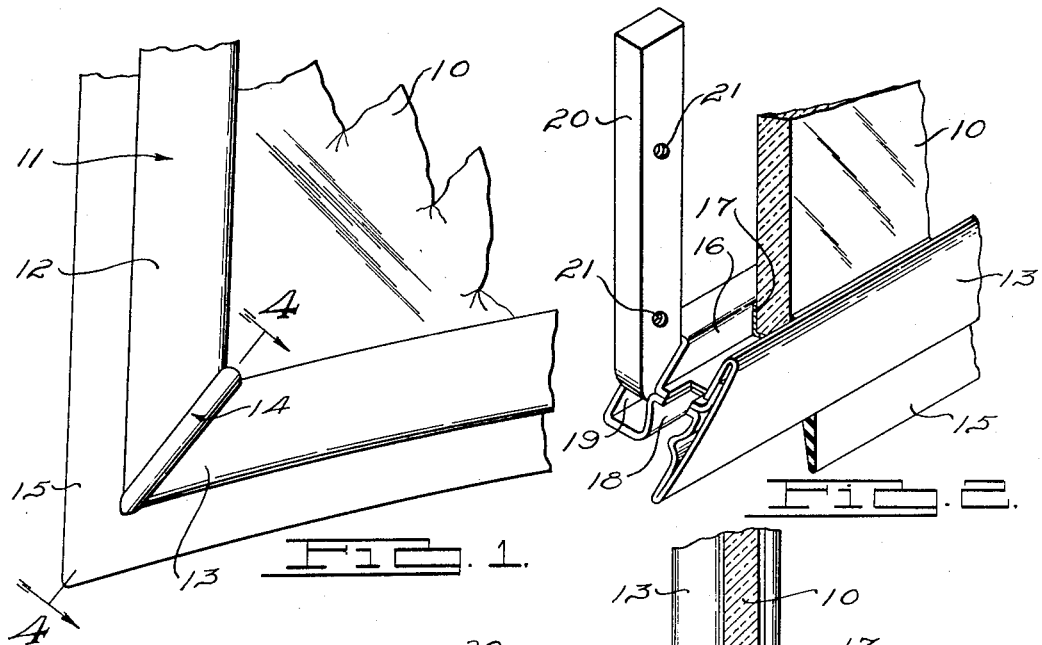
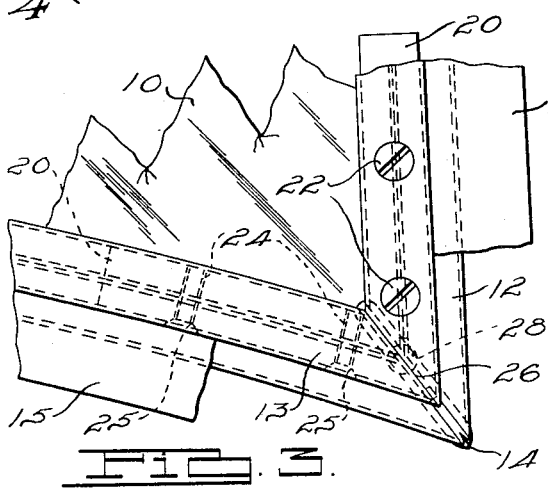
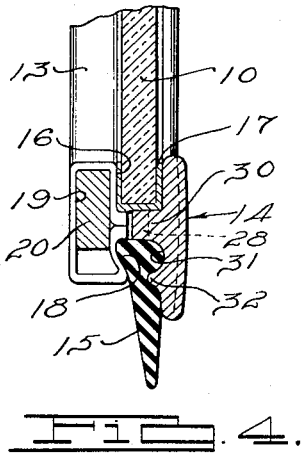
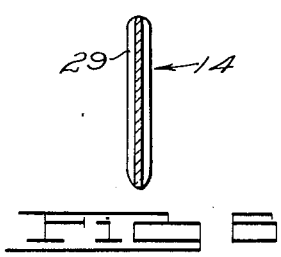
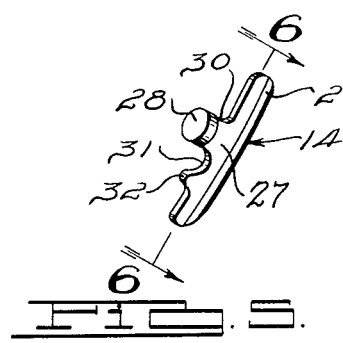
INVENTOR.
Albert T. Potter.
BY
Harness, Dickey, Pierce & Hann.
ATTORNEYS Patented Feb. 20, 1934

1,947,736

UNITED STATES PATENT OFFICE 1,947,736

FRAME CORNER BEAD

Albert T. Potter, Detroit, Mich., assignor to Ainsworth Manufacturing Corporation, a corporation of Michigan Application March 6, 1933. Serial No. 659,767

6 Claims. (Cl. 296—84)

My invention relates to windshield frames and the like, and more particularly to an improved corner construction and filler bead for use in an automobile windshield.

In the construction of automobile windshields, the frames are composed of side rail pieces which are joined together at their corners to enclose the windshield glass panel. The adjacent ends of these side rails are usually cut at forty-five degree angles to provide a miter joint. The joint must be sealed against air pressure and moisture and provide a pleasing outward appearance, and this has been done in the past by butt welding in some cases, and by providing a filler bead in some instances.

It is an object of my invention to provide an improved frame corner bead of efficient design, which is easy to assemble in position and economical to manufacture.

A further object of my invention is to provide an improved corner construction and a windshield frame which presents a beaded filler at the joint on one side of the frame and a smooth abutting finish on the opposite side thereof.

Other objects and advantages of my invention will readily become apparent throughout a reading of the following detailed description and accompanying drawing, in which:

Figure 1 is a fragmentary front elevation of one corner of a windshield frame embodying the improved joint construction and finishing bead of my invention.

Fig. 2 is a detailed perspective view of one corner of one rail of the frame showing the corner plug inserted therein.

Fig. 3 is a fragmentary rear elevation of one corner of the improved frame of my invention, parts being broken away to illustrate certain details more clearly.

Fig. 4 is a cross-sectional view of the corner joint taken on the line 4—4 of Fig. 1.

Fig. 5 is a perspective view of the improved finishing bead of my invention, and Fig. 6 is a cross-sectional view of the bead taken on the line 6—6 of Fig. 5.

Referring now to the drawing in detail in which like reference characters designate like parts throughout the several views, I have illustrated in Fig. 1, a windshield glass panel 10, the edges of which are enclosed in a frame 11 composed in part of side rails 12 and 13 respectively. The ends of the adjacent side rails 12 and 13 are cut at an angle of substantially forty-five degrees or at any other suitable angle to provide a miter joint.

A finishing bead 14 is illustrated as it appears when assembled in position to finish and seal the joint formed between the adjacent ends of the side rails 12 and 13. A rubber weather strip 15 extends around the outer edge of the frame.

The frame side rails 12 and 13 are preferably formed of one piece of metal into the shape and configuration best illustrated in Fig. 2. The rail is of tubular construction having an inwardly opening U-shaped channel 16 adapted to receive the glass panel 10, and the metal frame 17 which embraces the edges of the glass. An outwardly opening channel 18 is provided to receive the rubber weather stripping material 15 which is well known in the art. The channel 18, as shown in Figs. 2 and 4, converges inwardly at both sides of its outer edge to form a dovetail groove with an enlarged bottom to securely retain the weather strip therein. The side rail is formed into a wide flange on the outer side of the two channels to present a finished border frame of pleasing appearance when viewed from the front or outer side of the windshield, and to protect against weather. A tubular portion 19 is formed at the inner side of the two channels and is adapted to receive a corner plug 20, bent to an angle which is for the purpose of joining the two side rails and forming a strong joint. One leg of the angular plug 20 extends within the tubular portion 19 of each of the respective side rails 12 and 13, as best illustrated in Figs. 2 and 3.

The upwardly extending leg of plug 20 is drilled and tapered at 21 to receive machine screws 22 as shown in Figs. 2 and 3. These screws extending through the back of the rail 12 of the frame to secure the parts together, the other leg of the plug 20 is drilled and tapered at 24 to receive machine screws 25 which extend upwardly through the lower edge of the side rail 13 of the frame to hold the parts together. It is to be noted that the machine screws 25 extend upwardly while the screws 22 extend substantially horizontally, which permits drawing of the plug 20 downwardly whatever small amount is permitted by the clearance between the tubular portion 19 of the side rail 13 and the plug to effect a drawing together of the mitered corners of the side rails in close abutting relation.

It will be noted that in the construction of my invention, the rear side of the side rails 12 and 13, that is, the tubular portion, meet in abutting relation as illustrated in Fig. 3, to form a smooth surfaced joint at the point indicated by the numeral 26. This provides a smooth surface at the corner on the inner side of the frame which may be painted or otherwise dressed to provide the desired pleasing smooth finish on the interior of the windshield frame.

The ends of the side rails 12 and 13 are in spaced relation on the outer side of the frame as illustrated in Fig. 3. The filler bead 14 of my invention is then inserted between the spaced apart outer ends of the rails 12 and 13 respectively, by a driving fit to seal the outer joint in the desired manner.

The bead 14 is of novel design which has many advantages over any heretofore used in the art. It is made of soft metal having an intermediate portion 27 which is adapted to be wedged snugly between the spaced apart miter joint formed between the ends of the side rails 12 and 13. An enlarged head 28 is formed on the inner side of the bead which is adapted to closely underlie the respective inner edges of the outer flanged portion of the side rails and lock the bead against lateral outward movement and a widened flanged head 29 is adapted to overlie the respective outer edges of the ends of the rails 12 and 13 to seal the joint against weather. A shoulder 30 is formed on the inner edge of the bead which is adapted to underlie and abut the bottom of the metal frame 17 which embraces the edges of the glass 10 when the bead 14 is driven in assembled position, as shown in Fig. 4. A notch 31 is formed in the inner edge of the bead 14 below the head 28 and shoulder 30 and a projection 32 is formed immediately below the notch 31 for the purpose of engaging the rubber weather strip 15 and retaining it between the inward bevelled edges of the channel 18. The inner edge of the bead 14 will thus conform at its upper portion with the sides of the U-shaped channel 16 and at its lower portion with the sides of the channel 18 of the side rail.

When the bead 14 has been driven into assembled position, it will form a drive fit connection between the parts and be restrained from outward lateral movement by the head 28 and from upward and downward movement by the frame 17 of the glass panel and the rubber weather strip 15 respectively.

Among distinct advantages of the frame corner bead of my invention is the fact that the frame may be completely assembled, the reinforcing corner plug secured in position, and the glass panel 10 mounted in the frame, if desired, before insertion of the bead 14, which may readily be driven in between the spaced adjacent mitered ends of the side rails of the frame. The bead is therefore removable without disassembling the parts of the frame. The use of the removable drive fit plug of soft metal of my invention provides an absolutely weather proof tight joint and eliminates all possibility of looseness in the joint and rattling or squeeking of the parts since it is inserted after the tubular portion 19 of the ends of the side rail have been securely fastened to the corner plug 20 by the machine screws. This places a distinct advantage over any filler bead or material which requires placing between the ends of the side rails before the corner plug 20 is screwed in position.

A further distinct improvement in the corner frame construction of my invention lies in the fact that the ends of the inner portion of the side rail, which enclose the corner plug, are in abutting relation and provide a strong rigid joint, plus a smooth abutting interior finish which is desirable on the interior of motor cars, in combination with a spaced miter joint on the outer side of the windshield frame, which is sealed against the weather by the drive fit bead 14.

It will be noted in my improved construction that the weather strip 15 extends in unbroken relation around the corner of the frame which provides a complete weather-proof joint. This feature is provided by the use of my drive fit bead 14 which is wedged between only the outer portions of the frame and does not extend across the channel 18 so that the weather strip may extend in unbroken continuity completely around the corner of the frame.

Formal changes may be made in the specific embodiment of the invention described without departing from the spirit and substance of the broad invention, the scope of which is commensurate with the appended claims.

What I claim is:

1. A frame construction including a pair of frame members, the ends of which are cut to form a miter joint, a tubular portion formed on the inner side of said frame members, a corner plug receivable in the ends of the tubular portions of the frame members to connect said members, the ends of the tubular portions of said frame members being arranged in abutting relation to form a smooth surface on the inner side of the corner of said frame, a flange portion formed on the outer side of the frame members, the ends of said flange portions being disposed in spaced relation at the mitered corner joint and a corner bead adapted to be inserted between the spaced apart ends of the outer flanged portions of the frame by a drive fit connection.

2. A frame construction including a pair of frame members, the ends of which are cut to form a miter joint, a tubular portion formed on the inner side of said frame members, a corner plug receivable in the ends of the tubular portions of the frame members to connect said members, the ends of the tubular portions of said frame members being arranged in abutting relation to form a smooth surface on the inner side of the corner of said frame, a flange portion formed on the outer side of the frame members, the ends of said flange portions being disposed in spaced relation at the mitered corner joint and a corner bead adapted to be inserted between the spaced apart ends of the outer flanged portions of the frame by a drive fit connection, said corner bead having a flanged head overlying the outer edges of the ends of the flanged portions of the frame.

3. A frame construction including a pair of frame members, the ends of which are cut to form a miter joint, each of said frame members comprising an inner tubular portion and an outer flanged portion, a pair of channels formed between said tubular portions and said flange portions, one of said channels adapted to receive a glass panel and the other of said channels adapted to receive a weather strip, the ends of the tubular portions of said frame members being arranged in abutting relations to each other to form a smooth surface at the corner of the inner side of said frame, the ends of said flanged portions being disposed in spaced relation to each other at the mitered corner joint, and a corner bead disposed between the spaced apart ends of the outer flanged portion of the frame, said corner bead having a flanged head overlying the outer edges of the ends of the flanged portion of the frame and an inwardly headed portion closely underlying the inner edges of said flanged portion of the frame, said inner headed portion of the bead abutting the edge of the glass panel disposed in one of the aforementioned channels.

4. A frame construction including a pair of frame members, the ends of which are cut to form a miter joint, each of said frame members comprising an inner tubular portion and an outer flanged portion, a pair of channels formed between said tubular portions and said flange portions, one of said channels adapted to receive a glass panel and the other of said channels adapted to receive a weather strip, the ends of the tubular portions of said frame members being arranged in abutting relation to each other to form a smooth surface at the corner of the inner side of said frame, the ends of said flanged portions being disposed in spaced relation to each other at the mitered corner joint, and a corner bead disposed between the spaced apart ends of the outer flanged portion of the frame, said corner bead having a flanged head overlying the outer edges of the ends of the flanged portion of the frame and an inwardly headed portion closely underlying the inner edges of said flanged portion of the frame, said inner headed portion of the bead abutting the edge of the glass panel disposed in one of the aforementioned channels, and a weather strip disposed in the other of said channels formed between the tubular portion and the inner side of the flange portion and extending in unbroken continuity about the mitered corner of said frame.

5. A frame construction including a pair of frame members, the ends of which are cut to form a miter joint, said frame members being provided with an inner tubular portion and an outer flanged portion having a pair of oppositely opening channels formed therebetween, the mitered ends of the inner tubular portions of said frame being disposed in abutting relation to each other, a corner plug disposed in the ends of the tubular portions of the frame to connect said members together, the mitered ends of the outer flanged portions of the frame being disposed in spaced relation to each other and a corner bead disposed between the spaced apart ends of the outer flange portion by a drive fit connection, said bead having outwardly and inwardly headed portions adapted to overlie and closely underlie the respective outer and inner sides of the ends of said flange member, the inner edge of said bead portion being substantially shaped to conform to the inner side of the flange member whereby the channels formed between the flange member and tubular portions will extend about the corner of the frame is unbroken continuity.

6. A frame corner bead adapted to be inserted between the spaced apart ends of a frame corner comprising an intermediate portion adapted to fit between the spaced apart ends of said frame, an elongated head formed on one side of said intermediate portion to overlie the spaced apart edges of the ends of said frame along the entire width of said edge, a second headed portion adapted to closely underlie the opposite side of the spaced apart edges of said frame, said head underlying only a portion of said side of the edge of said frame and the inner edge of said intermediate portion being shaped to conform to the contour of the inner side of said frame member.

ALBERT T. POTTER.